June 27, 1961 C. BÜCKEN ET AL 2,990,225
ELASTICALLY DEFORMABLE RING SUPPORT FOR LIGHT ALLOY PISTONS
Filed Dec. 26, 1957 2 Sheets-Sheet 1

Inventors
Curt Bücken
Max Kühm
By Bailey, Stephens & Huettig
ATTORNEYS

June 27, 1961   C. BÜCKEN ET AL   2,990,225
ELASTICALLY DEFORMABLE RING SUPPORT FOR LIGHT ALLOY PISTONS
Filed Dec. 26, 1957   2 Sheets-Sheet 2

Inventors:
Curt Bücken
Max Kühm
By Bailey, Stephens & Huettig
ATTORNEYS

United States Patent Office 2,990,225
Patented June 27, 1961

2,990,225
ELASTICALLY DEFORMABLE RING SUPPORT FOR LIGHT ALLOY PISTONS
Curt Bücken, Heilbronn (Neckar), and Max Kühm, Neckarsulm, Germany, assignors to Karl Schmidt G.m.b.H., Neckarsulm, Germany
Filed Dec. 26, 1957, Ser. No. 705,242
4 Claims. (Cl. 309—14)

This invention relates to a light alloy piston for internal combustion engines. In particular, the invention is directed to a heavy metal elastically deformable ring support for a light alloy piston.

A running period amounting to at least 150,000 km. is demanded for engines, especially for diesel engines. The light metal alloys generally used for the pistons unfortunately have comparatively small durability and stabilization under heat and thus are subject to high wear and tear on those piston portions such as the piston head and ring section which are particularly exposed to heat.

As a practical matter, the running period of a modern disel piston is limited substanitally alone by the wear and tear on the upper ring groove or heat groove. An enlargement of the ring groove takes place because of this wear and tear, and the ring can thus make too large movements in an axial direction. Such movements result in oil pumping and high oil consumption, with also the passing of combustion gases behind the ring with a too great heating up of the ring, and finally in impact stresses so high as to cause the breaking of the ring.

Ever since light alloy pistons have been made for internal combustion engines, attempts to correct these faults have been by lining the ring groove with materials having high heat durability and strength. Such groove liners have been composed of steel or massive endless rings composed of iron materials to serve as the ring supports. If the use of such support liners has been restricted to the upper ring groove alone and in only a small part of the total piston production, it has been because the known forms of the liner supports have many technical faults and besides such liners are economically expensive so as to be impractical for the use of precisely formed liners in the construction of the engines.

In addition to the above disadvantages, ring liner supports composed of steel and iron have another disadvantage, without regard to their weight as affecting high mass forces, in that high stresses appear in the inner face between the ring support and the piston body because of the different co-efficient of expansion between the light piston alloy and the heavy metal ring supports. These stresses result in the loosening of the ring support in the piston body and also result in the breaking of the ring support. Therefore, these ring supports are not technically practicable, and their use has been questioned constantly.

Attempts have also been made to make the liner supports of high nickel steels so that their co-efficient of expansion can be matched to that of the light alloy piston body. Such attempts have the disadvantages of too great weight and of the expense of the nickel alloys. The latter increases the piston price beyond that which would be allowable in the whole engine construction.

It was further known to produce massive ring liner supports in the form of sheets and having alternating inner and outer radial recesses. Such readily yieldable supports can relieve the stresses produced by the difference in heat expansion against the light alloy piston body without the danger of breakage. However, the manufacturing of these liner supports is expensive because of the extensive turning and milling of the supports so that these liner supports were not found to be practical.

Finally, it has also been suggested that the ring liner support be composed of a wavy or corrugated shaped steel band. This accomplishes a large degree of readily yielding deformation which would give security against the breaking of the liner support because of the greater heat expansion of the light alloy piston body. But the part of the steel liner which acts to carry the ring in the ring groove is so small as compared with the carrying part of the piston body as to preclude the prevention of the highest decrease in the wear and tear on the piston body. This arrangement has another basic disadvantage in that portions of the light alloy piston body lying outwardly of the wavy steel band are not very stable and can break out radially. This danger is not exaggerated when it is realized that, in the turning of the ring grooves, only small portions of the light alloy material remain between the bottom of the ring groove and the embedded wavy steel band, and these portions are not thoroughly secured to the outside of the piston.

The objects of this invention are to produce a ring liner support which avoids the above disadvantages.

In general, these objects are accomplished by producing the ring liner support of individual stamped sheet metal members which are laminated flush upon one another, are rigidly connected to each other, and forming the liner support with recess on its inner and outer circumferences, respectively, so that the outer recesses prevent a breaking away in a radial direction of the light piston alloy left in these recesses, the piston body material being secured by a dovetail-like joint.

The means by which the objects of the invention are obtained are described more fully with respect to the accompanying drawings, in which.

Figure 1:
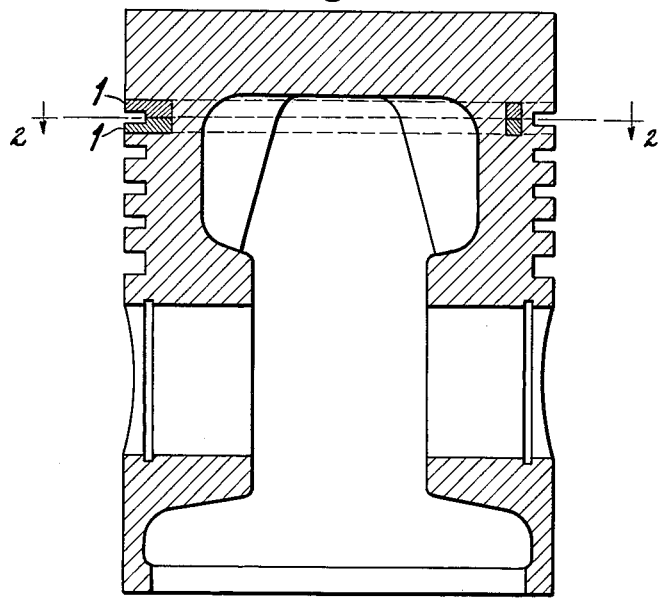
FIGURE 1 is a vertical cross-sectional view through a light alloy piston and taken on the line 1—1 of FIGURE 2.
Figure 2:
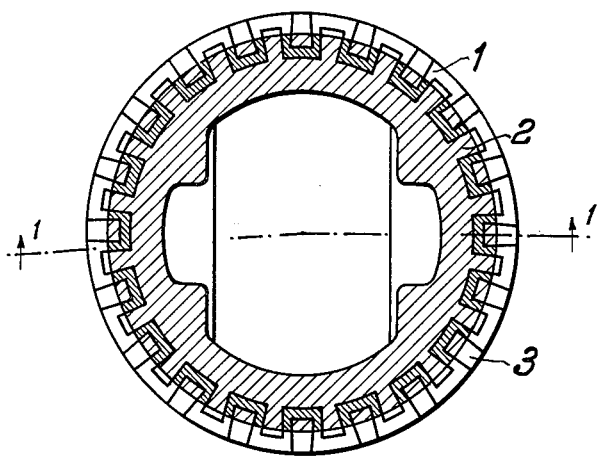
FIGURE 2 is a horizontal crdoss-sectional view taken on line 2—2 in FIGURE 1.

In order to obtain the greatest economy, the ring liner support 1 of FIGURES 1 and 2 is formed by stamping or punching a metal sheet of steel having a high tensile strength of about 60 kg./mm.². The thickness of a piston ring in the direction of the axis of a piston having a diameter up to about 150 mm. is about from 2 to 3 mm. The ring support liner is about 6 to 8 mm. thick. The individual punched metal sheets have a thickness of up to about 4 mm. The individually punched metal sheets are laminated flush upon one another and connected by means of spot welding. In this way, ring liner supports of desired overall thickness are produced in a short time and at low cost.

To obtain the greatest possible ready yielding to deformation and thus to avoid unallowable stresses between the ring liner support and the light alloy piston body, the punched sheet metal members have recesses 2 on the inner circumference of each member and recesses 3 on the outer circumference of each member. These recesses, as shown in FIGURE 2, are such that the width of each outer recess 3 increases toward the center of the line of support, while the width of each inner recess decreases in the same direction. By so doing, it is possible to obtain an entirely secure connection between the ring liner support and the light alloy piston body so that after the ring groove is turned, the breaking out in a radial direction of the light alloy material remaining in the outer recesses is avoided.

Figure 3:
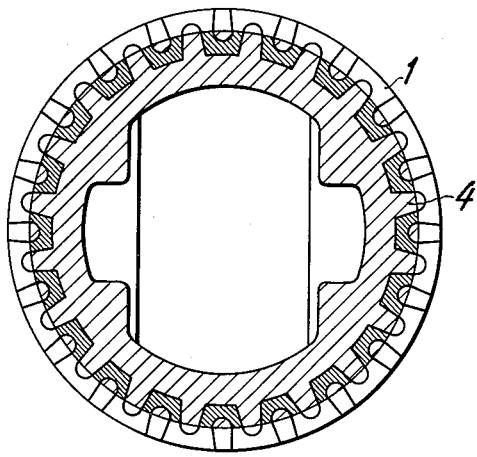
FIGURES 3 and 4 are similar views, respectively, of modifications of the ring support liner.

As shown in FIGURE 3, the inner recesses are shaped so that wedge shaped portions of the piston body extend therein and thus take care of the stresses appearing on the inner circumference of the liner support by reason of the difference in heat expansion between the piston body and ring liner support. In this case, the width of each inner recess 4 is increased toward the center line of the support. The side edges of the recesses are given a wavy shape.

Figure 4:
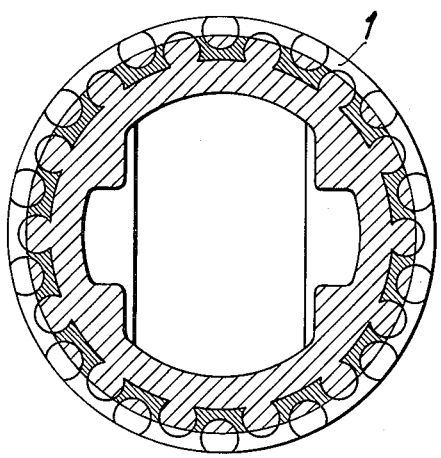

In FIGURE 4, a construction is shown which is especially economical for the punching of the sheet. Here the inner and outer recesses are circular in form so that the readily yielding deformation construction is maintained in that the inner and outer recesses are deep enough to contain some piston body material after the ring groove is cut.

The ring liner support of this invention gives substantially toal security against the breaking of the liner support because the latter is permitted to yield when deformed by means of the inner and outer recesses so that it follows the larger heat expansion of the piston body without creating destructive stresses.

Having now described the means by which the objects of the invention are obtained, we claim:

1. In a light alloy piston for internal combustion engines, an elastically deformable piston ring support liner in a ring groove comprising a plurality of laminated sheet metal closed annulus members having recesses alternately cut out of the inner and outer circumferences, respectively, of said members, each recess being varied in its width from the outer periphery of its member, said members being embedded as unbroken closed rings in the piston with their outer circumferences flush with the surface of the piston, and a ring groove cut in said members and extending short of said inner circumference to expose the metal of said piston through said recesses and to prevent the radial breaking out of the exposed piston metal.

2. In a piston as in claim 1, the recesses in the inner circumference decreasing in width toward the center of each member, and the recesses in the outer circumference increasing in width toward the center of each member.

3. In a piston as in claim 1, the recesses in the inner circumference increasing in width toward the center of each member, and the side edges of the recesses being wavy shaped.

4. In a piston as in claim 1, said recesses being of circular shape.

References Cited in the file of this patent

UNITED STATES PATENTS

| | | |
|---|---|---|
| 2,685,729 | Daub | Aug. 10, 1954 |
| 2,707,136 | Fahlman | Apr. 26, 1955 |
| 2,760,834 | Daub | Aug. 28, 1956 |
| 2,771,328 | Wainwright et al. | Nov. 20, 1956 |

FOREIGN PATENTS

| | | |
|---|---|---|
| 455,539 | France | May 27, 1913 |

OTHER REFERENCES

Daub, German application 1,023,272, printed January 23, 1958 (K1 46c'9).